United States Patent

[11] 3,600,881

| | | |
|---|---|---|
| [72] | Inventor | Wellington W. Porter<br>R. D. #2, Dublin Road, Waterloo, N.Y. 13165 |
| [21] | Appl. No. | 885,154 |
| [22] | Filed | Dec. 15, 1969 |
| [45] | Patented | Aug. 24, 1971 |

[54] PUMPKIN HARVESTER
8 Claims, 7 Drawing Figs.

| | | |
|---|---|---|
| [52] | U.S. Cl. | 56/327 |
| [51] | Int. Cl. | A01d 45/00 |
| [50] | Field of Search | 56/327, 328, 344 |

[56] References Cited
UNITED STATES PATENTS

| | | | |
|---|---|---|---|
| 132,960 | 11/1872 | Garver | 56/344 |
| 2,441,244 | 5/1948 | Kimball | 56/328 R |
| 2,639,573 | 5/1953 | McLaughlin | 56/328 R |
| 2,845,769 | 8/1958 | Hintz et al. | 56/344 |

*Primary Examiner*—Russell R. Kinsey
*Attorney*—F. P. Keiper

ABSTRACT: Harvester for rows of pumpkins comprising an elevator having a plurality of guide slats disposed in spaced side-by-side relation, with forward portions extending forwardly and horizontally along the ground, and inclined rearward portions extending upwardly to an elevator discharge area, and side parallelogram-like frames having opposed facing conveyor chain channel member guides, the guides extending along the ground on opposite sides of the forward portions, and the inclined portions extending parallel with the slat inclined portions and disposed at a substantial spacing normal therefrom, endless chains having conveyor pusher bars at evenly spaced intervals extending transversely across the slats, the bars moving along the forward slat portions to move the harvest toward the inclined portion, and thereafter moving upwardly in spaced relation from the inclined rearward portion of the slats to propel the harvest up the inclined slats to the discharge area, a radially ribbed impeller wheel disposed to one side of the elevator and adapted to move pumpkins laterally onto the forward slat portions.

PATENTED AUG 24 1971

INVENTOR.
WELLINGTON W. PORTER

F. P. Kuper

INVENTOR
WELLINGTON W. PORTER.

INVENTOR.
WELLINGTON W. PORTER

PATENTED AUG 24 1971 3,600,881

INVENTOR.
WELLINGTON W. PORTER.

PUMPKIN HARVESTER

This invention relates to harvesters for relatively large round objects such as pumpkins.

The harvest of pumpkins has heretofore required manual labor in the field to lift the pumpkins from the ground into trucks, which follow along. Since pumpkins grow to a weight of 60 pounds, the manual lifting of pumpkins from the ground to load them on trucks is a tedious job. In practice, before loading the pumpkins, they are severed from the vines, as by tractor carried inclined guides that forcibly move the pumpkins laterally into relatively straight rows, breaking the stems in the process, the tractor treads riding over the vines of the two adjacent rows to hold the vines from uprooting while the pumpkins are moved laterally and their stems broken.

The present invention relates to a harvester adapted to move along beside rows of pumpkins thus severed from their vines, and is adapted to collect the pumpkins by laterally propelling them into a low close to ground section of a conveyor, which thereafter elevates the pumpkins by conveyor pusher bars, for lateral discharge into trucks moving with the conveyor. For laterally propelling the pumpkins into the conveyor, a large impeller wheel with substantially radial ribs, and disposed at an angle across the pumpkin row is employed. Through the employment of a conveyor that transports on the inside, the lower end of the conveyor is close to ground the readily receives pumpkins impelled into the conveyor.

The above and other novel features of the invention will appear more fully hereinafter from the following detailed description when taken in conjunction wit the accompanying drawings. It is expressly understood that the drawings are employed for purposes of illustration only and are not designed as a definition of the limits of the invention, reference being had for this purpose to the appended claims.

In the drawings, wherein like reference characters indicate like parts:

Figure 1:
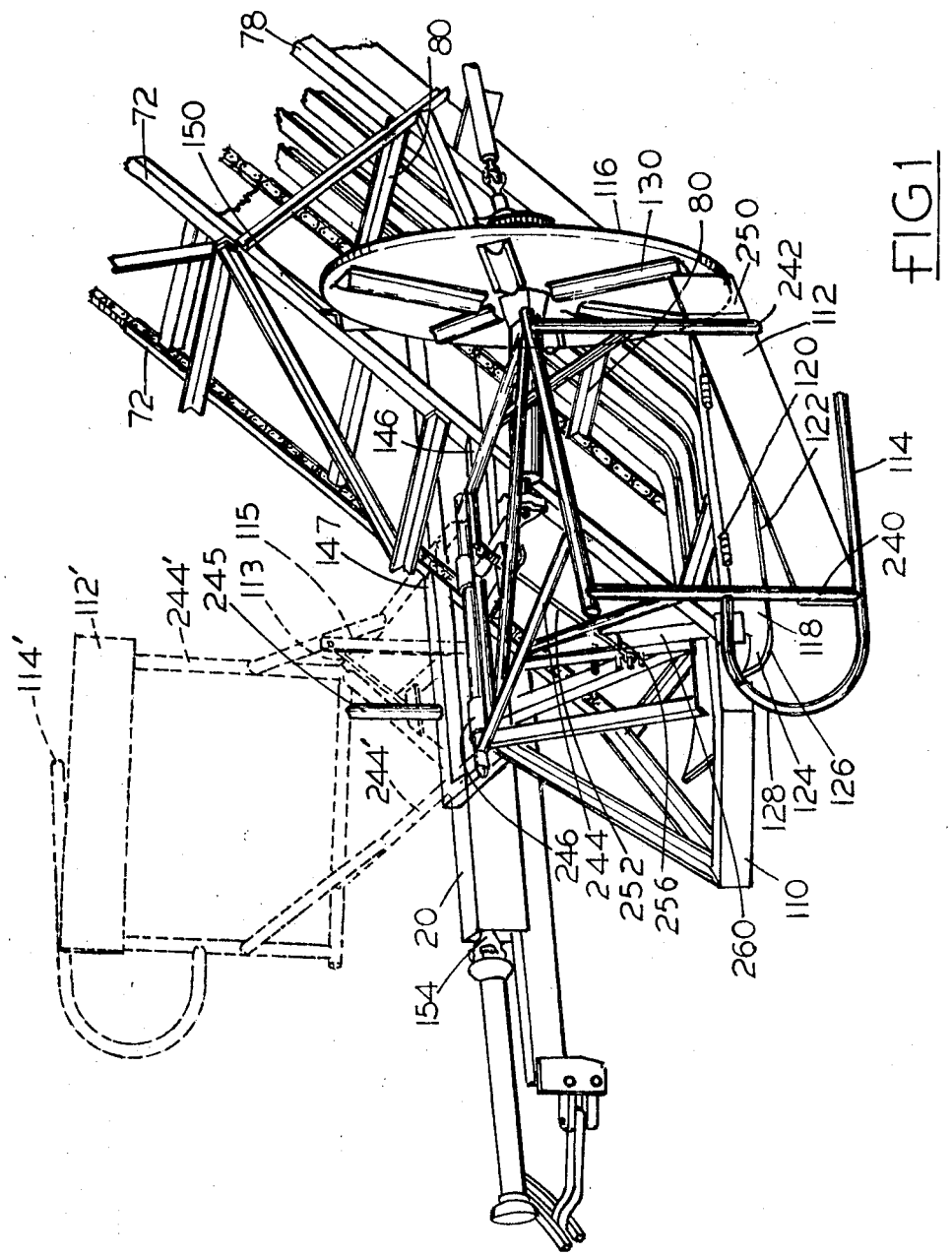
FIG. 1 is a perspective view of the forward end of the harvester.
Figure 2:
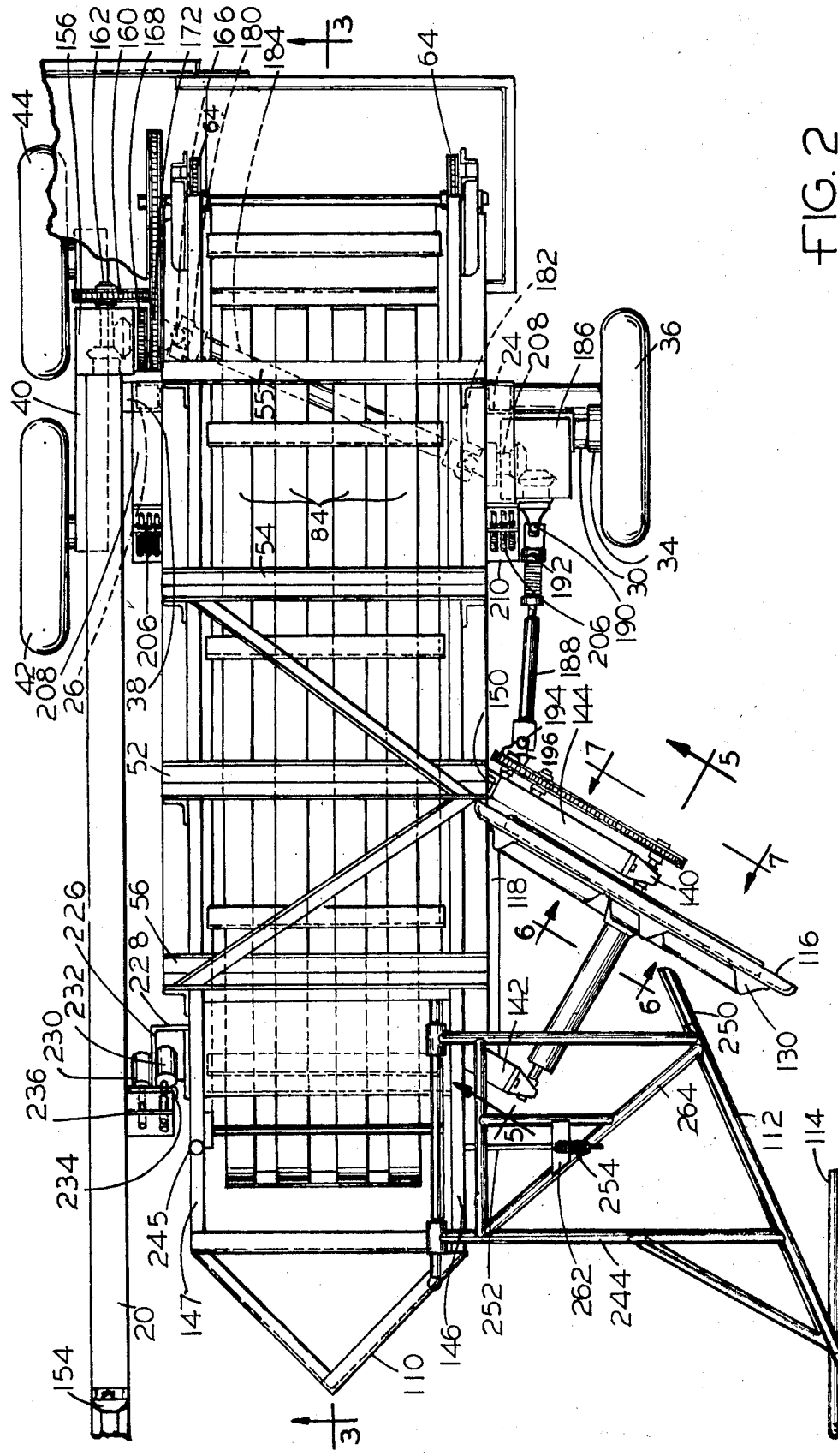
FIG. 2 is a plan view of the harvester.
Figure 3:
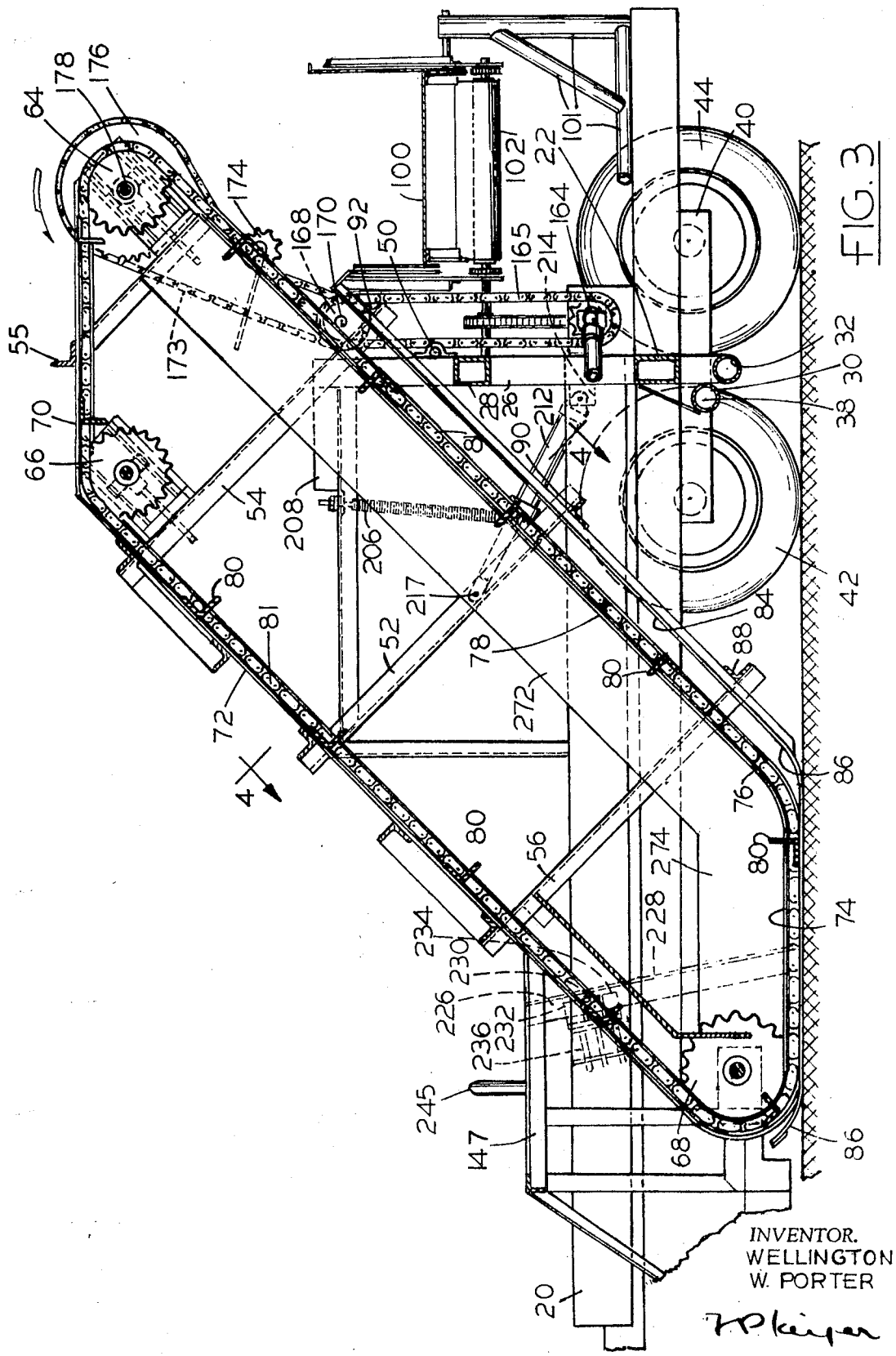
FIG. 3 is a longitudinal sectional view taken substantially on the line 3—3 of FIG. 2.
Figure 4:
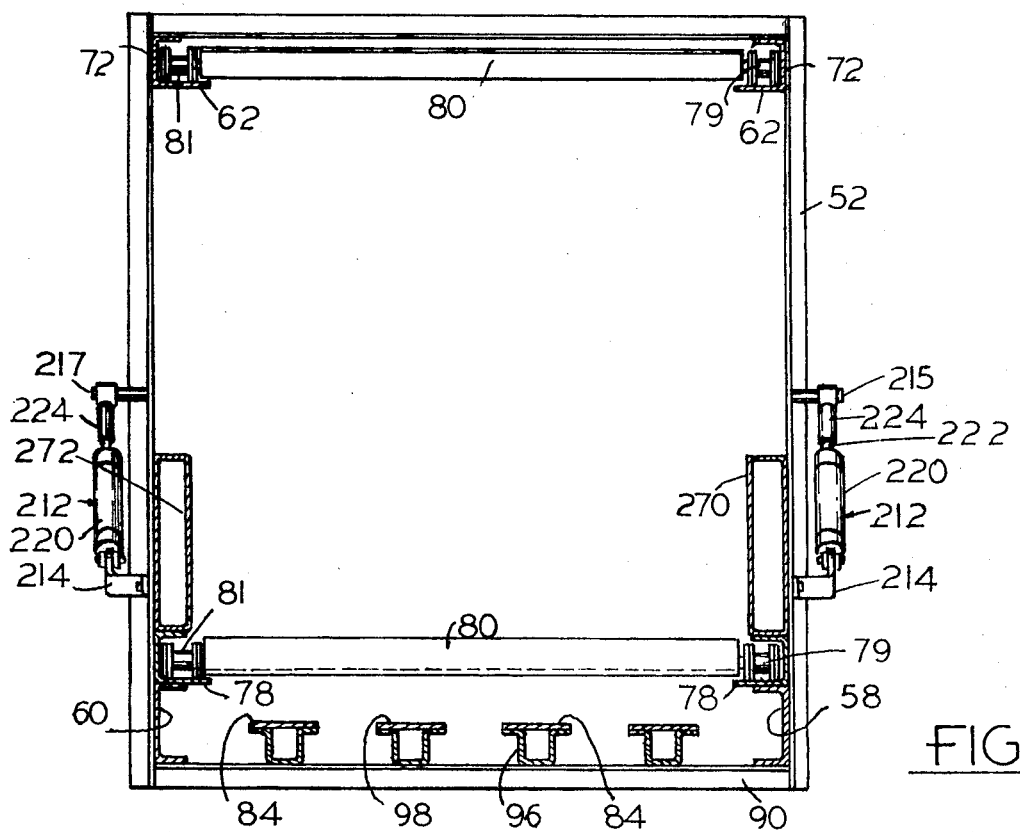
FIG. 4 is a sectional view transverse of the inclined conveyor, taken substantially on the line 4—4 of FIG. 3.
Figure 5:
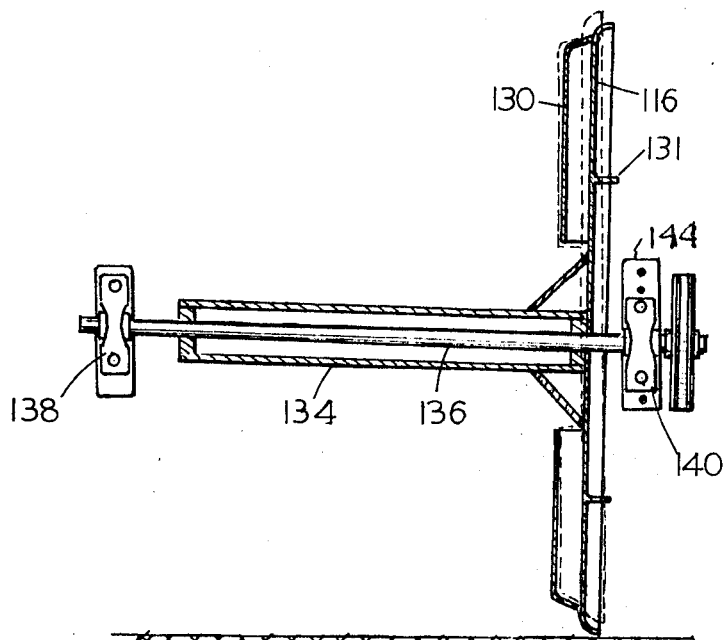
FIG. 5 is a sectional view through the axis of the impeller, taken on the line 5—5 of FIG. 2.

Referring to FIGS. 1-3 there is shown a tractor-drawn harvester having a rigid drawbar 20 extending along the right-hand side to a rear transverse frame member comprising a lower tubular section transverse member 22, spaced uprights 24 and 26, and a tie member 28. The transverse member is provided with downwardly extending members on opposite sides, each having tubular transverse sockets such as 30 and 32, at different levels, into either of which the stub axle 34 of the single left-hand wheel 36 may be locked, and the stub shaft 38 of the twin wheel pivot bar 40 may be locked, the pivot bar having stub axles to receive the wheels 42 and 44, it being noted in FIG. 3 that the stub shaft 38 is located forward of the center between wheels 42 and 44, to facilitate turning, rearward wheel 44 being under lighter load and thus more readily able to slide laterally on the ground during turning. As shown, the socket 30 is being employed as in the case where the ground is level. When the wheels ride in furrows, the stub shaft 38, and stub axle 34 are locked in place in the lower sockets 32.

Pivotally mounted on a transverse bar 50 extending from upright 24 to upright 26 is an inclined conveyor frame, having two rectangular frames 52, 54 extending at right angles to laterally spaced inclined channel members 58 and 60. A third lower frame 56, open on the left-hand side, is also provided, the open side permitting lateral movement of the harvest into the conveyor. A fourth frame 55 at the upper end is also provided. Each of the conveyor side members, in addition to including one of the channel members 58 or 60 includes a conveyor chain guide channelway 62, associated with spaced drive sprockets 64, and idler sprockets 66 and 68, in three corners of each of the substantially parallelogram side frames. The guide channelway comprises narrow deep channel members on opposite sides facing inwardly, there being an upper channel section 70, with its lower or inside flange cutaway to receive the periphery of the sprocket 66, the channel member extending downwardly and forwardly as at 72 to the sprocket 68 where its inside flange is again cutaway. The guide channelway comprises a horizontal section 74 extending close to the ground at the rear end of which there is a curved section 76, the channelway continuing with an inclined section 78 extending upwardly and rearwardly in a direction tangential to the periphery of the drive sprocket 64, but terminating short thereof. The inclined sections 78 rest on the channel members 58 and 60. Extending between the sprocket chains 79 and 81 at the uniformly spaced intervals are transverse pusher bars 80 in the form of angle irons, the opposite ends of which are affixed to the corresponding links of the chains.

Between the side frames, and below the pusher bars 80, are a plurality of smooth parallel runway slats 84 each of which extends from a forward inclined transverse plate 86, rearwardly at ground level to a point beyond the curve section 76 in the chain guide, whence the runways curve upwardly as at 86 and thereafter extend upwardly at an angle, being supported upon the transverse angle irons 88, 90 and 92 of the frames 56, 52 and 54. Each runway slat comprises an inverted hat section member 96, to which is secured to smooth slat 98 of Ryertex or other low-friction material. Such slats terminate above one side of the transverse inclined chute 100 which discharges upon a transverse elevator 102 adapted to extend laterally away from the harvester for discharge into a truck, which moves along the field with the harvester. Such chute and elevator are mounted on suitable rear framing such as 101. It will be seen that the pusher bars 80 move along the horizontal portion of the slats substantially in contact therewith so that the side chains are disposed close to the ground, whereas over the inclined portions, the pusher bars are spaced from the slats a sufficient distance to move the pumpkins up the slats without any roll back.

The forward end of the frame is provided with fender 110, adapted to move material on the ground, in front of the conveyor to either side thereof. In practice, the pumpkins to be harvested have been previously moved into a row to the left of the conveyor, and out of the way of a tractor coupled to the drawbar 20. The forward end of the frame is provided with an inclined deflector plate 112 having a ground skid 114, which plate tends to move the pumpkins into line with the lower portion of the impeller wheel 116, which moves the harvest laterally into the conveyor and upon the horizontal portion of the slats, there being provided a laterally inclined apron or ramp 118 hinged as at 120 along one end of the chain channel member, with the other edge 122 riding on the ground. The apron 118 has a forward upwardly curved prow 124 with an inclined side edge 126 terminating in a point 128 adjacent the frame side member, such apron being adapted to slide over pumpkin vines, rocks, and other debris.

Towards the rear of the apron 118 and the deflector plate 112 there is provided the impeller wheel 116, he lower portion of which lies in the path into which the pumpkins are guided by the fender 110 and deflector plate 112. The impeller wheel with its substantially radial ribs 130 is adapted to move the pumpkins laterally over the apron 118 into the path of the conveyor pusher bars 80. The wheel is rigidified by bracing as at 131 on the back side thereof.

Figure 7:
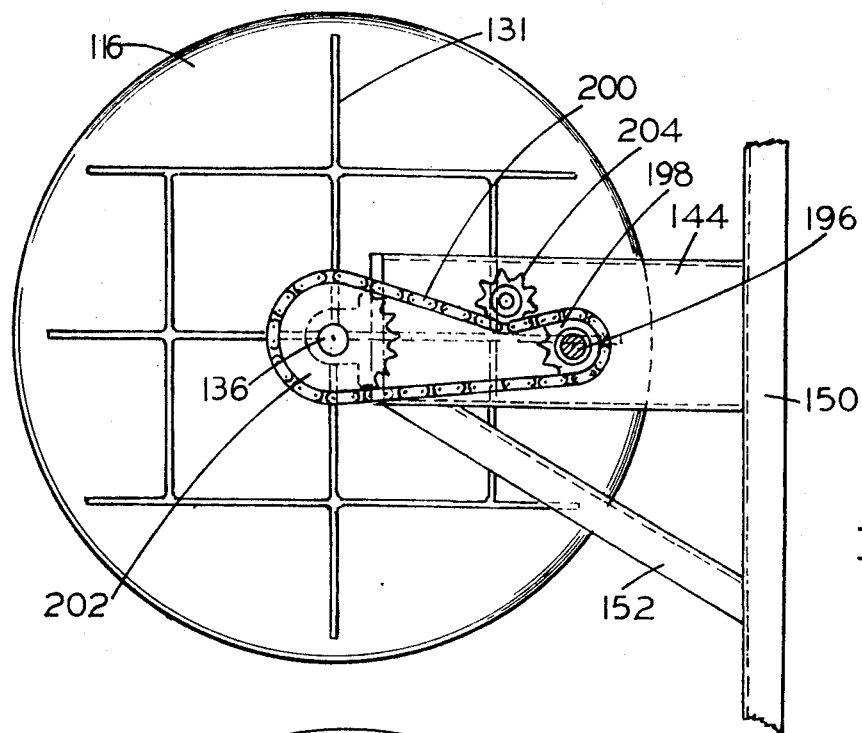
FIG. 7 is a rear view of the impeller and the drive, taken from the line 7—7 of FIG. 2.
Figure 6:
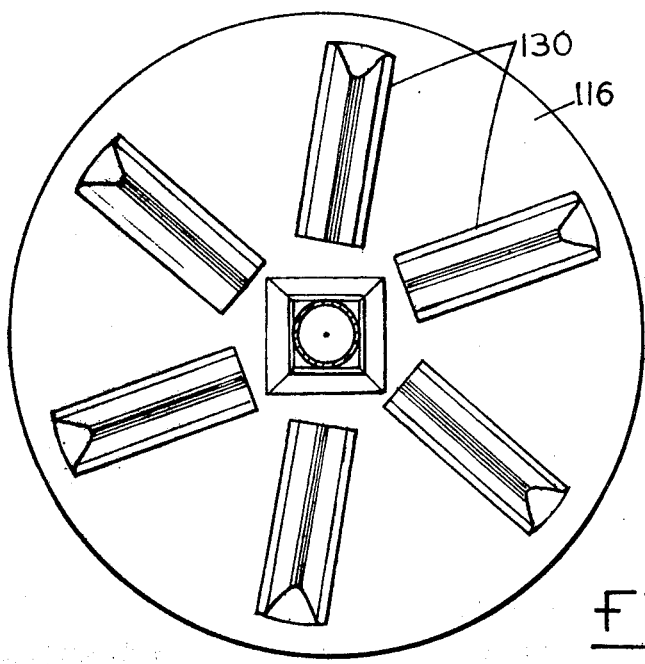
FIG. 6 is a face view of the impeller wheel, taken from the line 6—6, of FIG. 2.

The impeller wheel 116 is disposed in a plane at about 60° from the longitudinal axis of the harvester. The wheel is provided with a heavy tubular shaft 134, disposed about a shaft 136, the ends of which are journaled in bearings 138 and 140 supported on a bracket 142 and 144 respectively. The bracket 142 is affixed to the side of the forward projecting side member 146 and inclined channel member 72 while the arm 144 extends outward from an upright angle iron member 150, the arm being further braced as at 152, as indicated in FIG. 7.

Drive for the conveyors and the impeller wheel 116 may be derived from the tractor, the hollow drawbar 20 being provided with a shaft 154 extending from the forward end and through the drawbar to the rear end thereof where the shaft is coupled to a miter gearbox 156.

The lateral elevator 102 is driven by a sprocket chain drive 160 from a stub shaft 162 projecting from the rear of the miter gearbox 156, while the pusher bar conveyor is driven from a chain drive 165 from a sprocket 164 located on the transverse output shaft 166 on the gearbox, such chain drive extending upwardly to a sprocket 168 mounted on a stub shaft 170, which sprocket drives a second sprocket 172, the chain 173 of which extends over an idler 174 to the driven sprocket 176 on the drive shaft 178 on which the drive sprockets 64 are keyed, of the pusher bar elevator.

The impeller 116 which is driven from the transverse output shaft 166 of the gearbox 156 through a pair of universal joints 180 and 182 and transverse shaft 184 leading to a second miter gearbox 186 disposed on the left side of the harvester. A drive shaft 188 having a universal joint 190, and a slip clutch 192 extends forwardly to a universal joint 194 which in turn drives a stub shaft 196 having a sprocket 198, driving a chain 200 extending to a sprocket 202 on the impeller wheel shaft 136, such chain being provided with an idler 204.

It will be seen that the pusher conveyor frame is pivotally supported on the transverse rod 50. To counterbalance the weight of its forward end, a plurality of tension springs 206 extending from arms 208 projecting forward from each of the uprights 24 and 26 is provided, the springs extending to lateral perches 210 affixed to the side members 58 and 60.

In order to lift the forward end of the conveyor from the ground for transport from field to field, or to facilitate a turn around, hydraulic elevating struts 212 extend from perches 214 on the posts 24 and 26 diagonally upwardly to lateral pivots 215 and 217 mounted on the side members 216 and 218 of the frame 52. Each elevating strut comprises a hydraulic cylinder 220 having a piston rod 222 the free end of which extends into a telescopic sleeve 224 swiveled on the lateral pivots 215 and 217.

To resist lateral sway of the pusher bar elevator, the flange 226 of a forward inclined angle iron 228 of the conveyor frame, which is disposed somewhat tangential to the pivot bar 50 is held between rollers 230, 232 and 234 pivoted on stub shafts affixed to a bracket 236 on the inside face of the draw bar 20. In practice two rollers 232 and 234 are disposed on parallel stub shafts on one side of the flange, while a single roller 230 is disposed on the other side.

The forward deflector or guide plate 112 is shown as affixed to uprights 240 and 242 extending to an outboard frame 244 which is pivoted as at 246 to the forward extension 146 of the left side of the frame. By removing a short detachable extension member 250 adjacent the impeller wheel 116, such frame 244 can be lifted and swung over to the position indicated at 244' in FIG 1, where it is placed whenever the harvester is to be transported from or to a field for harvest. In order to increase the effective weight of the guide plate, so that it will not lift away from the ground during harvest, a diagonal rod 252 and compression spring 254 extending from a bracket 256 on the upright 260 to a plate 262 on the diagonal 264 is provided. By loading the spring, the guide plate 112 and stop arm 115 braced as at 113, which engages the upright 260, is yieldingly held down. The rod 252 is disconnected from the bracket 256 whenever the guide plate is moved to the transport position indicated at 244'. A rest or post 245 supports the frame 244 when in the position indicated at 244' from frame 147.

Sheet metal sideboards 270 and 272 on opposite sides of the pusher bar elevator are provided along the inclined portion thereof, and the sideboard 272 is extended as at 274 along the right-hand side.

From the foregoing it can be seen that the impeller wheel moves the pumpkins readily up the ramp to clear the pusher bar conveyor chain guide, which is disposed at ground level. The pumpkins are thus placed in the path of the pusher bars, and are propelled up the conveyor ramp, inside the conveyor structure. Thus by using the inside of the lower part of a conveyor, the forward receiving end may be disposed close to the ground and thereby facilitate propelling the pumpkins laterally into the conveyor for elevating.

While a single embodiment of the invention has been illustrated and described, it is to be understood that the invention is not limited thereto. As various changes in the construction and arrangement may be made without departing from the spirit of the invention, as will be apparent to those skilled in the art, reference will be had to the appended claims for a definition of the limits of the invention.

What is claimed is:

1. A harvester for pumpkins and the like disposed in rows, comprising an elevator having a plurality of guide slats disposed in spaced side-by-side relation, and having forward portions extending forwardly and horizontally along the ground, and inclined rearward portions extending upwardly to an elevator discharge area, and side parallelogram-like frames comprised of opposed facing conveyor chain channel member guides, said guides extending along the ground on opposite sides of said slat forward portions, and inclined portions extending parallel with the slat inclined portions and disposed at a substantial spacing normal therefrom, endless chains in the channel members, conveyor pusher bars at relatively evenly spaced intervals extending transversely in respect to said slats, and having their opposite ends secured to said chains, means for driving the chains, whereby the bars move along the forward slat portions to move the harvest toward the inclined portion, and thereafter move upwardly in spaced relation from the inclined rearward portion of the slats to propel the harvest up the inclined slats to the discharge area.

2. A harvester as set forth in claim 1 having means to move pumpkins and the like laterally onto the forward slat portions.

3. A harvester as set forth in claim 2 wherein the means comprises an impeller wheel disposed in a plane extending at an angle crosswise of the horizontal slat portions to the rear thereof, the impeller wheel having on its front face radially disposed impeller ribs, and having its lower peripheral portion disposed to one side of the elevator, and means for rotating the lower peripheral portion of the wheel toward the elevator, whereby the harvester when moved along a row of pumpkins or the like in alignment with the lower peripheral potion of the wheel, causes the harvest to be moved by the wheel across the adjacent conveyor chain guide onto the horizontal slat portions whence the harvest is moved to and elevated along the inclined portions of the slats.

4. A harvester as set forth in claim 2 having converging spaced guides disposed forwardly of the lateral moving means to align a harvest row for engagement with said means.

5. A harvester as set forth in claim 3 having converging spaced guides disposed forwardly of the lower peripheral portion of the impeller wheel to align a harvest row for engagement with the lower peripheral portion of the impeller wheel.

6. A harvester as set forth in claim 4 wherein one of the guides furthest from the conveyor is retractable.

7. A harvester as set forth in claim 1 wherein the elevator is disposed to one side of a drawbar adapted for coupling to a tractor, and in which the drawbar is provided with a rearward transverse frame having ground wheels, and in which the elevator is supported on the frame on a transverse pivot, and in which the weight of the forward end of the elevator including the horizontal slat portions is partially counterbalanced by tension springs extending from said transverse frame to the elevator.

8. A harvester as set forth in claim 7 wherein hydraulic lift struts extend between the frame and the elevator forward of its transverse pivot to elevate the forward end of the elevator for transport out of ground contact.